United States Patent
Horvath et al.

(10) Patent No.: US 8,671,295 B2
(45) Date of Patent: Mar. 11, 2014

(54) GENERATING A SIGNAL TO REDUCE COMPUTER SYSTEM POWER CONSUMPTION FROM SIGNALS PROVIDED BY A PLURALITY OF POWER SUPPLIES

(75) Inventors: Stephen Ejner Horvath, Roseville, CA (US); Kevin Edward Boyum, Roseville, CA (US); Martin Goldstein, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 810 days.

(21) Appl. No.: 12/512,541

(22) Filed: Jul. 30, 2009

(65) Prior Publication Data

US 2011/0029793 A1   Feb. 3, 2011

(51) Int. Cl.
*G06F 1/26* (2006.01)
*G06F 1/32* (2006.01)

(52) U.S. Cl.
USPC ........... 713/320; 713/300; 713/323; 713/340; 307/43

(58) Field of Classification Search
USPC ............. 713/300, 320, 323, 324, 340; 307/43
See application file for complete search history.

(56) References Cited

U.S. PATENT DOCUMENTS

| | | | | |
|---|---|---|---|---|
| 5,668,417 A | * | 9/1997 | Wiscombe et al. | 307/64 |
| 7,457,976 B2 | | 11/2008 | Bolan et al. | |
| 7,493,503 B2 | | 2/2009 | Aldereguia et al. | |
| 2005/0172157 A1 | * | 8/2005 | Artman et al. | 713/300 |
| 2006/0007626 A1 | * | 1/2006 | Ohshima | 361/143 |
| 2007/0150757 A1 | * | 6/2007 | Aldereguia et al. | 713/300 |
| 2010/0332868 A1 | * | 12/2010 | Tan et al. | 713/310 |

OTHER PUBLICATIONS

X. Wang et al., Managing Peak System-level Power with Feedback Control, IBM Research Report, Dec. 19, 2005, pp. 1-13.

* cited by examiner

*Primary Examiner* — Paul Yanchus, III
*Assistant Examiner* — Michael J Brown

(57) ABSTRACT

A signal suitable for signaling a computer system to reduce power consumption is generated from a plurality of power supplies. The signal is asserted when at least one of the power supplies of the plurality of power supplies signals impairment, and at least one of the power supplies of the plurality of power supplies signals that the power supply is supplying current above a threshold level.

19 Claims, 2 Drawing Sheets

GENERATING A SIGNAL TO REDUCE COMPUTER SYSTEM POWER CONSUMPTION FROM SIGNALS PROVIDED BY A PLURALITY OF POWER SUPPLIES

BACKGROUND

In the art of computing, it is desirable to provide redundancy so that a computer system can continue to function after the failure of a component. Power supply redundancy allows a computer system to continue to function when a power fails to produce a proper power supply output.

BRIEF DESCRIPTION OF THE DRAWINGS

The Figures depict embodiments, implementations, and configurations of the invention, and not the invention itself.

DETAILED DESCRIPTION

Figure 1:
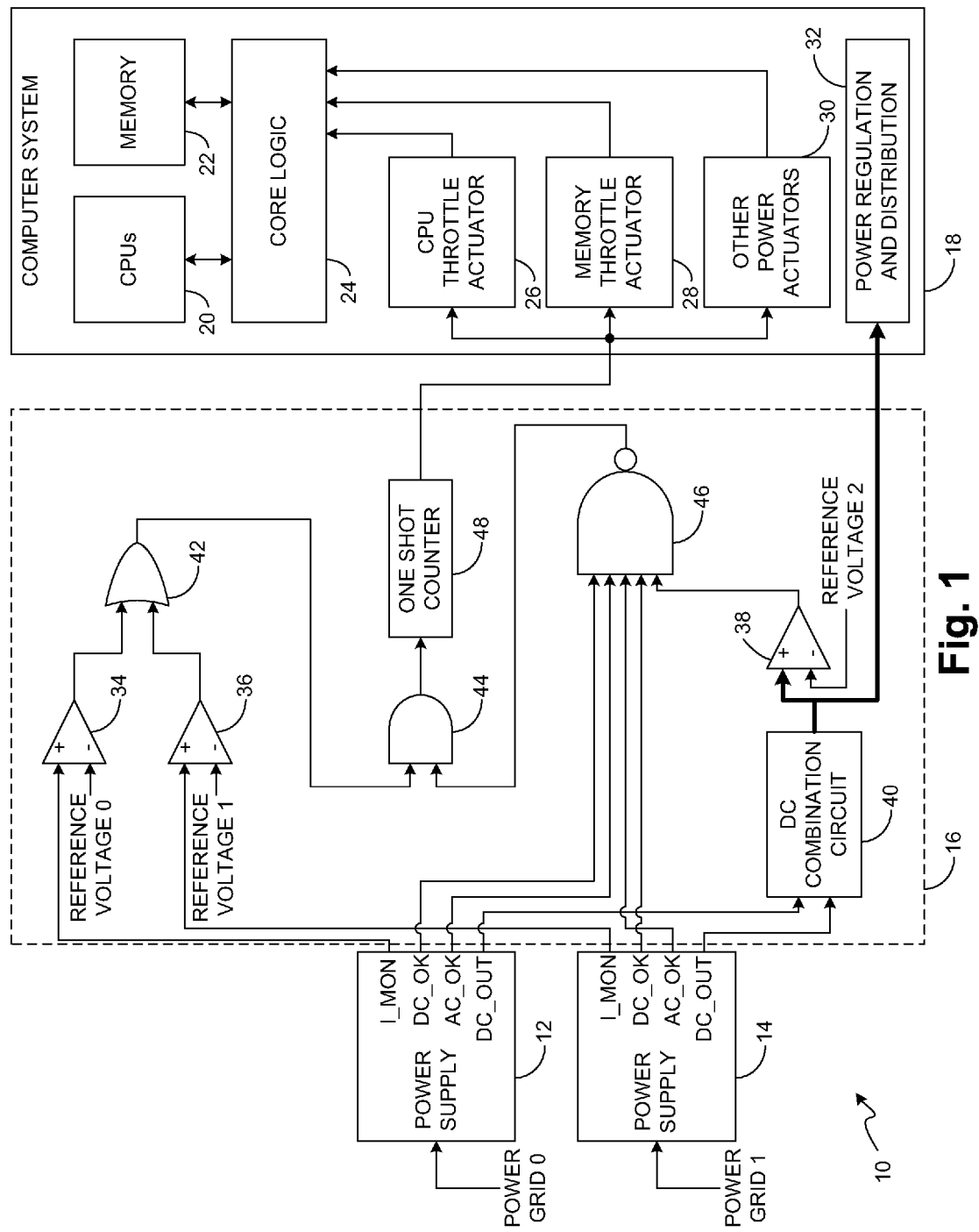
FIG. 1 shows a system that incorporates embodiments of the present invention for generating a signal to reduce computer system power consumption from signals provided by a plurality of power supplies.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

Embodiments of the present invention relate to power supplies, a computer system, and a circuit that signals the computer system when a power supply has failed and a remaining power supply is operating above a threshold.

In the art of computing, redundancy provides excess capacity so that the failure of a single component does not result in downtime of the computer system. One common type of redundancy known in the art is N+1 redundancy, where N is the number of components needed for the computer system to continue operating. For example, a rack of servers may require four power supplies to operate, and the rack is provided with five power supplies. If one power supply fails, the computer system can continue operation with the remaining four power supplies.

Smaller computer systems may only require a single power supply, so such a computer system having N+1 redundancy would have two power supplies. Such a configuration can double the cost of the power supplies.

Embodiments of the present invention provide two or more power supplies, which together provide sufficient power for the computer system to operate at peak performance levels. A circuit monitors the power supplies. If the circuit determines that one power supply has failed, or is in the process of failing, and a remaining power supply is operating above a threshold associated with the capacity of the remaining power supply, a signal is generated by the circuit that causes the computer system to reduce power usage to be within the capacities of the remaining power supplies. The computer system can continue to operate at lower performance levels until the failed power supply can be replaced. Accordingly, power supply costs are reduced since full N+1 redundancy to support a maximum power workload is not required, and less expensive lower capacity power supplies can be used, while still providing some redundancy.

Some power supplies provide status signals, which will be used by embodiments of the present invention. For example, the Murata D1U-W-1200-48-Hx Series has signals for AC_OK, P_Good, and I_Share. The AC_OK signal is a binary signal that indicates that the AC input voltage is acceptable. The P_Good signal is a binary signal that indicates that the DC output of the power supply is at an acceptable voltage level. The I_Share signal is an analog signal proportional to the current output when not connected to another I_Share signal of another power supply. For the D1U-W-1200-48-Hx Series power supplies, when the I_Share signal is not connected to the I_Share signal of another power supply, the I_Share will be at zero when the output current is zero, and will be at 8V when the current is at the maximum specified current output of the power supply. When I_Share signals of two or more power supplies are coupled together, the power supplies share the current load fairly evenly.

Other manufacturers assign different names for these signals. For example, the P_Good signal is often called DC_OK, and the I_Share signal is often called I_Mon. Furthermore, some manufactures may use a different voltage range for the I_Share signal. One implementing embodiments of the present invention can either purchase power supplies with these signals, or specify that these signals be available when requesting power supplies from an original design manufacturer (ODM). In the description of the embodiments below, these signals will be referred to as AC_OK, DC_OK, and I_Mon. However, those skilled in the art will recognize that other signal names may be used.

FIG. 1 shows a system 10 that incorporates embodiments of the present invention. Embodiments of the inventions will be discussed with reference to a computer system having two power supplies. However, those skilled in the art will recognize that concepts disclosed herein can be expanded to include three or more power supplies.

DETAILED DESCRIPTION

System 10 includes power supplies 12 and 14, circuit 16, and computer system 18. Each power supply provides a DC power output at DC_OUT, and also provides the AC_OK, DC_OK, and I_Mon signals discussed above. Power supply 12 is connected to power grid 0, and power supply 14 is connected to power grid 1.

Computer system 18 includes CPUs 20, which represents one or more central processing units, memory 22, core logic 24, CPU throttle actuator 26, memory throttle actuator 28, other power actuators 30, and power regulation and distribution 32. Power regulation and distribution 32 represents DC-to-DC converters and the distribution network that transmits power to other components of computer system 18. Typically a single DC voltage, such as +48V, is provided to the computer system, and other required DC voltages, such as +3.3V, +5V, +12V, and any other required voltage levels, are provided by DC-to-DC converters.

Core logic 24 represents the core logic that couples CPUs 20 and memory 22. In some architectures, core logic 24 includes a Northbridge and a Southbridge. However, other architectures are known in the art. For example, in some architectures, the memory controller is provided in the CPU. For the purposes of describing embodiments of the present invention, core logic 24 also includes other components found in a typical computer system, such as firmware and I/O components, disk controllers, USB ports, video controllers, and the like. CPU throttle actuator 26, memory throttle actuator 28, and other power actuators 30 represent mechanisms used to adjust power consumption, and will be discussed in greater detail below.

Turning to circuit 16, circuit 16 includes analog comparators 34, 36, and 38, DC combination circuit 40, OR gate 42, AND gate 44, NAND gate 46, and one-shot counter 48. Comparator 34 has a "+" input coupled to the I_Mon output of power supply 12 and a "−" input coupled to reference voltage 0. Similarly, comparator 36 has a "+" input coupled to the I_Mon output of power supply 14 and a "−" input coupled to reference voltage 1. As discussed above, the I_Mon output of each power supply is an analog signal proportional to the current output of the power supply, with the I_Mon output having a maximum voltage (such as 8V in the discussion above) when the power supply is providing current at the maximum level specified for the power supply.

Typically reference voltages 0 and 1 will be selected to represent a threshold to trigger comparators 34 and 36, respectively, when the respective power supply is operating near capacity. For example, reference voltages 0 and 1 could be selected to be 90% of the maximum voltage provided by the I_Mon signals of power supplies 12 and 14. Often power supplies 12 and 14 will be matched power supplies, and reference voltages 0 and 1 will be selected to have the same value. However, reference voltages 0 and 1 may be selected to have different values to accommodate power supplies 12 and 14 having I_Mon outputs with different maximum outputs.

Accordingly, the output of comparator 34 will go high when power supply 12 is providing current above a threshold close to the maximum capacity of power supply 12, and comparator 36 will go high when power supply 14 is providing current above a threshold close the maximum capacity of power supply 14. The outputs of comparators 34 and 36 are coupled to the inputs of OR gate 42. Accordingly, the output of OR gate 42 will go high when either power supply or both power supplies are supplying current above the thresholds defined by reference voltages 0 and 1. The output of OR gate 42 is coupled to an input of AND gate 44, which will be discussed in greater detail below.

The DC_OUT outputs of power supplies 12 and 14 are provided to DC combination circuit 40, which merges the current output of power supplies 12 and 14 and provides a single power supply output to power regulation and distribution 32 of computer 18. Circuits for combining current from power supplies are known in the art, and range from simple circuits that couple the outputs together, to more complex circuits that actively seek to balance current load. Note that if the output impedances of the power supplies are matched, if a first power supply is drawing more current then a second power supple, the voltage of the first supply will drop slightly, causing the second power supply to supply more current. Accordingly, matched power supplies tend to "self-balance" when their outputs are joined.

The output of DC combination circuit 40 is provided to a "+" input of comparator 38. Reference voltage 2 is provided to a "−" input of comparator 38. Reference voltage 2 is selected based on the minimum acceptable voltage provided at the output of DC combination circuit 40. For example, if the power supplies normally provide 48V, reference voltage 2 could be selected to be 46V. Normally the output of comparator 38 will be high. When the output of DC combination circuit 40 drops below reference voltage 2, the output of comparator 38 goes low. The output of comparator 38 is coupled to an input of NAND gate 46.

Also coupled to inputs of NAND gate 46 are the DC_OK and AC_OK outputs of power supplies 12 and 14. The DC_OK outputs will be high as long as each power supply is providing an acceptable DC output, and the AC_OK outputs will be high as long as each power supply is receiving and acceptable AC input.

Collectively, each input of NAND gate 46 signals impairment of one or more power supplies. Since all the inputs to NAND gate 46 are normally high, the output of NAND gate 46 will normally be low. However, if any of the AC_OK or DC_OK outputs go low, or the voltage provided by DC combination circuit drops below reference voltage 2, the output of NAND gate 46 will go high.

The output of NAND gate 46 is provided to AND gate 44, along with the output of OR gate 42, as discussed above. Normally the output of AND gate 44 will be low. However, if any of the AC_OK or DC_OK outputs go low, or the voltage provided by DC combination circuit 40 drops below reference voltage 2, and either power supply or both power supplies are supplying current above the thresholds defined by reference voltages 0 and 1, the output of AND gate 44 will go high, thereby indicating that computer system 18 should reduce power consumption.

The output of AND gate 44 is provided to one shot counter 48. Counter 48 conditions the output of AND gate 44 to provide hysteresis, thereby preventing computer system 18 from going in and out of throttle mode by not toggling the actuators at a high frequency. One shot counter 48 immediately passes a high output from AND gate 44 to the actuators. If the output of AND gate 44 later goes low, one shot counter 48 will continue to assert the actuator for a period of time until the counter expires. The ideal duration for the counter can be determined by experimentation and other system response parameters. An acceptable duration for certain implementations may be approximately 10 microseconds.

The output of one shot counter 48 is provided to CPU throttle actuator 26, memory throttle actuator 28, and other power actuators 30. CPU throttling is known in the art and can dramatically reduce energy consumption of a computer system. In a typical server, the CPUs can consume half of the total power consumed by the computer system, and present CPU throttling techniques can reduce CPU power consumption by as much as 30-60% as quickly as 250 microseconds.

Current memory throttling techniques provide less energy savings than current CPU throttling techniques, but it is anticipated that memory throttling will provide greater energy savings in the future. Current memory throttling techniques include operating memory at lower frequencies and inserting additional wait states. An optimistic target for reducing memory power consumption is 33%. However, using present techniques, the reduction will be smaller. Also, memory power usage tends to be a smaller share of total system power usage. For example, memory power usage may comprise 10-30% of total system power usage in a typical computer system.

Other power actuators 30 represent any other opportunities to reduce power consumption. For example, it might be possible to lower the rotational speed of cooling fans, operate video adapters at lower performance levels, or power down certain hard drives.

Note that embodiments of the present invention provide a closed loop system. Starting from normal operation, if the output of one shot counter 48 is asserted, computer system 18 can quickly reduce power to a minimum predetermined level that is known to be within the power capacity of a single power supply. After doing so, the output of one shot counter 48 will go low after the output of AND gate 44 goes low and the counter expires. Thereafter, computer system 18 can incrementally increase power usage until the output of counter 48 goes high again, and then drop back to the highest level of power usage possible without causing the output of counter 48 to go high. Also note that embodiments of the present invention do not invoke throttling if a power supply fails, and the remaining power supply can supply the full load, as determined by comparators 34 and 36, and OR gate 42.

As shown in FIG. 1, power supplies 12 and 14 are coupled to different power grids, thereby providing additional redundancy. If one power grid fails, the AC_OUT signal (and eventually the DC_OUT signal) of the power supply coupled to that power grid will go low, and the I_Mon signal from the other power supply will increase, thereby triggering throttling if the I_Mon signal is higher than the threshold defined by reference voltage 0 or 1.

A simpler embodiment of the present invention can be implemented using only the I_Mon and DC_OK signals. In general, if a power grid fails or AC power is lost for some other reason, AC_OK will typically go low before DC_OK, thereby providing advance warning of an impending failure, and also providing a certain amount of redundancy. Furthermore, the voltage droop detect function provided by comparator 38 also provides a sanity check and a certain amount of redundancy in the event that the AC_OK and DC_OK signals do not go low.

Figure 2:
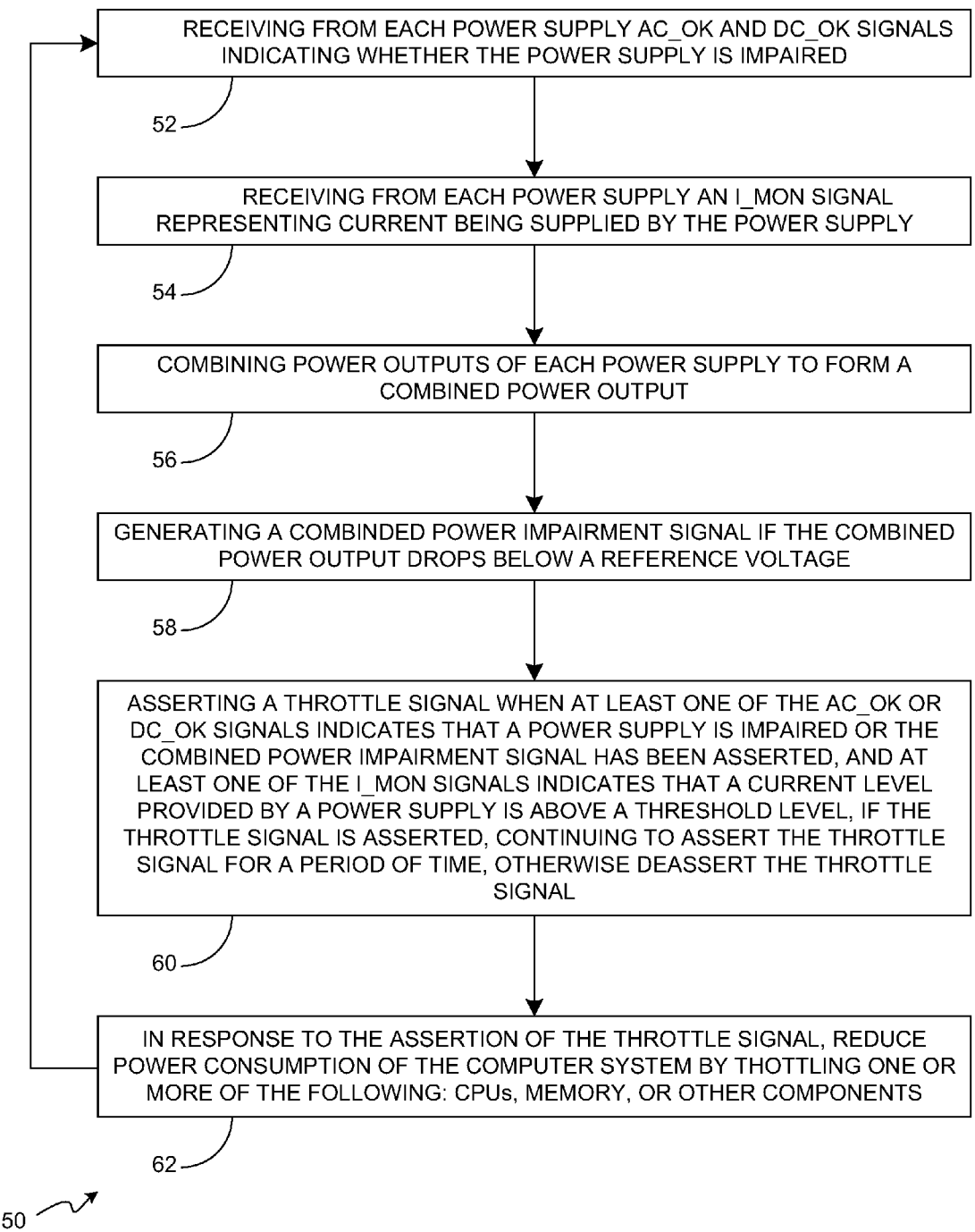
FIG. 2 shows a flow chart that illustrates a method performed by embodiments of the present invention.

FIG. 2 shows flow chart 50, which illustrates a method performed by embodiments of the present invention more broadly than the system shown in FIG. 1. Since embodiments of the present invention may be implemented in a circuit, those skilled in the art will recognize that many of the steps will be performed in parallel, with the ultimate ordering and parallelism of steps defined by the particular circuit configuration.

At block 52, embodiments of the present invention receive from each power supply AC_OK and DC_OK signals indicating whether a power supply is impaired. As mentioned above, any signal identifying impairment may be used, although the AC_OK and DC_OK signals are provided by many power supplies known in the art. Control flows to block 54.

At block 54, embodiments of the present invention receive from each power supply an I_Mon signal representing current being supplied by each power supply. Any signal providing similar functionality may be used. Control flows to block 56.

At block 56, the power outputs of each power supply are combined to form a combined power output. Control flows to block 58. At block 58, a combined power impairment signal is generated and asserted if the combined power output drops below a reference voltage. Control flows to block 60.

At block 60, a throttle signal is asserted when at least one of the AC_OK or DC_OK signals indicates that a power supply is impaired or the combined power impairment signal has been asserted, and at least one of the I_Mon signals indicates that a current level provided by a power supply is above a threshold level. If the throttle signal has been asserted, the throttle signal will continue to be asserted for a period of time. Otherwise, the throttle signal is not asserted. Control flows to block 62.

At block 62, in response to the assertion of the throttle signal, power consumption of the computer system is reduced by throttling CPUs, memory, or other components, or a combination of these devices. Control passes back to block 52, and the method repeats.

Embodiments of the present invention provide a cost efficient method of providing a redundancy. Full N+1 redundancy is not required. Two power supplies capable of meeting the power requirements of a computer system operating at maximum power consumption may be provided, with neither power supply able to supply the power needed at by the computer system at maximum power consumption by itself. If a power supply fails, embodiments of the present invention determine whether the remaining power supply can meet the present power requirements of the computer system. If the remaining power supply can meet the present power requirements, throttling is not invoked. If the remaining power supply cannot meet the present power requirements, the computer system is signaled to reduce power consumption to be within the capacity of the remaining power supply. Operation of the computer system can continue, albeit at a possibly reduced performance level, until the failed power supply can be replaced. Accordingly, the present invention allows less expensive power supplies to be deployed, while maintaining operational redundancy.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A circuit comprising:
   current monitoring inputs for receiving from a plurality of power supplies signals representing a current level being provided by each of the plurality of power supplies;
   impairment inputs for receiving from the plurality of power supplies signals indicating whether one or more power supplies of the plurality of power supplies is impaired;
   a throttle output for sending to a computer system a signal directing the computer system to reduce power consumption;
   logic circuits coupled to the current monitoring and impairment inputs and the throttle output, for asserting the throttle output when at least one of the impairment inputs indicates impairment of one or more power supplies of the plurality of power supplies and when at least one of the current monitoring inputs indicates that a current level provided by a power supply of the plurality of power supplies is above a threshold level;
   a DC combination circuit, for combining DC power outputs from each power supply to form a combined power output; and
   a comparison circuit for determining whether the combined power output has dropped below a reference voltage, wherein the logic circuits further include logic circuits for asserting the throttle output when at least one of the impairment inputs indicates impairment of one or more power supplies of the plurality of power supplies or the combined power output has dropped below the reference voltage, and when at least one of the current monitoring inputs indicates that a current level provided by a power supply of the plurality of power supplies is above a threshold level.

2. The circuit of claim 1 wherein the signals representing the current levels being provided by each of the plurality of power supplies comprise I_Mon outputs of the power supplies.

3. The circuit of claim 1 where the signals indicating whether one or more power supplies are impaired comprise an AC_OK and a DC_OK signal front each power supply, wherein the AC_OK signal indicates that the power supply is receiving an acceptable AC voltage input, and the DC_OK signal indicates that the power supply is providing an acceptable DC power output.

4. The circuit of claim 1 wherein the logic circuits include a counter that maintains the asserted throttle output for a minimum interval.

5. The circuit of claim 1, wherein the current monitoring inputs receive signals from one of the plurality of power supplies representing a dynamic current level individually provided by said one of the plurality of power supplies during supply of power by said one of the plurality of power supplies and wherein the throttle output is asserted in response to the dynamic current level being individually provided by said one of the plurality of power supplies exceeding a threshold level that is less than a maximum capacity of said one of the power supplies.

6. The circuit of claim 1, wherein the logic circuits assert the throttle output when the combined power output has dropped below the reference voltage and when at least one of the current monitoring inputs indicates that a current level provided by power supply of the plurality of power supplies is above a threshold level.

7. A system comprising:
a plurality of power supplies, each power supply having a current monitoring output signal for providing a signal representing a current level being provided by the power supply and an impairment output signal for indicating whether the power supply is impaired;
a computer system having an actuator input for controlling power consumption of the computer system;
logic circuits coupled to the current monitoring and impairment outputs of the plurality of power supplies and the throttle input of the computer system, for asserting the throttle input when at least one of the impairment output signals indicates impairment of one or more power supplies of the plurality of power supplies and when at least one of the current monitoring output signals indicates that a current level provided by a power supply of the plurality of power supplies is above a threshold level, wherein the logic circuits include a counter that maintains the asserted actuator input of the computer system for a minimum interval;
a DC combination circuit, for combining DC power outputs from each power supply into a combined power output; and
a comparison circuit for determining whether the combined power output has dropped below a reference voltage, wherein the logic circuits further include logic circuits for asserting the actuator input of the computer system when at least one of the impairment output signals of the plurality of power supplies indicates impairment of one or more power supplies of the plurality of power supplies or the combined power output has dropped below the reference voltage, and when at least one of the current monitoring output signals of the plurality of power supplies indicates that a current level provided by a power supply of the plurality of power supplies is above a threshold level.

8. The system of claim 7 wherein the current monitoring output signal of each power supply comprises an I_Mon output signal.

9. The system of claim 7 wherein the impairment output signal of each power supply comprises at least two signals, including an AC_OK signal that indicates that the power supply is receiving an acceptable AC voltage input, and a DC_OK signal that indicates that the power supply is providing an acceptable DC power output.

10. The system of claim 7 wherein the actuator input of the computer system causes power consumed by one or more central processing units to be reduced.

11. The system of claim 7 wherein the actuator input of the computer system causes power consumed by system memory to be reduced.

12. The system of claim 7, wherein the current monitoring output signals represent a dynamic current level individually provided by said one of the plurality of power supplies during supply of power by said one of the plurality of power supplies and wherein the throttle output is asserted in response to the dynamic current level being individually provided by said one of the plurality of power supplies exceeding a threshold level that is less than a maximum capacity of said one of the power supplies.

13. The system of claim 7, wherein the logic circuits assert the throttle output when the combined power output has dropped below the reference voltage and when at least one of the current monitoring inputs indicates that a current level provided by power supply of the plurality of power supplies is above a threshold level.

14. A method for throttling power consumption of a computer system based on status signals from a plurality of power supplies comprising:
receiving from each power supply of the plurality of power supplies at least one signal indicating whether the power supply is impaired;
receiving from each power supply of the plurality of power supplies a signal representing current being supplied by the power supply;
asserting a throttle signal of the computer system to reduce power consumed by the computer system when at least one of the signals indicating whether a power supply is impaired has been asserted and at least one of the signals representing current being supplied by a power supply indicates that a current level provided by the power supply is above a threshold level;
combining power outputs of the plurality of power supplies to form a combined power output;
generating a combined power impairment signal if the combined power output drops below a reference voltage; and
wherein asserting a throttle signal further comprises asserting a throttle signal of the computer system to reduce power consumed by the computer system when at least one of the signals indicating whether a power supply is impaired or the combined power impairment signal has been asserted, and at least one of the signals representing current being supplied by a power supply indicates that a current level provided by the power supply is above a threshold level.

15. The method according to claim 14 wherein the signals indicating whether the power supply is impaired include an AC_OK signal indicating whether the AC input voltage to the power supply is acceptable.

16. The method according to claim 14 wherein the signals indicating whether the power supply is impaired include a DC_OK signal indicating whether the DC output voltage provided by the power supply is acceptable.

17. The method according to claim 14 and further comprising:
in response to asserting a throttle signal, the computer system throttling power usage of one or more central processing units.

18. The method according to claim 14 and further comprising:
- in response to asserting a throttle signal, the computer system throttling power usage of memory.

19. The method of claim 14 comprising asserting the throttle signal when the combined power impairment signal has been asserted and at least one of the signals representing a current being supplied by a power supply indicates that a current level provided by the power supply is above a threshold level.

* * * * *

UNITED STATES PATENT AND TRADEMARK OFFICE
CERTIFICATE OF CORRECTION

| | | |
|---|---|---|
| PATENT NO. | : 8,671,295 B2 | Page 1 of 1 |
| APPLICATION NO. | : 12/512541 | |
| DATED | : March 11, 2014 | |
| INVENTOR(S) | : Stephen Ejner Horvath et al. | |

It is certified that error appears in the above-identified patent and that said Letters Patent is hereby corrected as shown below:

In the Claims

In column 6, line 66, in Claim 3, delete "front" and insert -- from --, therefor.

Signed and Sealed this
Twelfth Day of August, 2014

Michelle K. Lee
*Deputy Director of the United States Patent and Trademark Office*